United States Patent [19]
French

[11] Patent Number: 4,991,289
[45] Date of Patent: Feb. 12, 1991

[54] CRIMPING DIE AND CRIMPED ELECTRICAL CONNECTION THEREFROM

[75] Inventor: Jay L. French, Middletown, Pa.

[73] Assignee: AMP Incorporated, Harrisburg, Pa.

[21] Appl. No.: 370,922

[22] Filed: Jun. 23, 1989

[51] Int. Cl.[5] .................... H01R 43/04; B23P 19/00
[52] U.S. Cl. .................... 29/863; 29/753; 29/519; 29/861
[58] Field of Search .................... 29/856, 861, 863, 753, 29/519

[56] References Cited

U.S. PATENT DOCUMENTS

| | | | |
|---|---|---|---|
| 2,359,084 | 9/1944 | Carlson . | |
| 2,446,542 | 8/1948 | MacInnes | 29/519 X |
| 2,639,754 | 5/1953 | Macy . | |
| 2,693,216 | 11/1954 | Kerchner et al. . | |
| 2,722,146 | 11/1955 | Byrem . | |
| 3,010,183 | 11/1961 | Forney, Jr. | 29/863 X |
| 3,098,517 | 7/1963 | Zell et al. . | |
| 3,146,519 | 9/1964 | Redwine | 29/863 X |
| 3,412,596 | 11/1968 | Burns | 29/753 X |
| 3,430,185 | 2/1969 | Sitzler et al. . | |
| 3,601,760 | 8/1971 | Cairns . | |
| 3,686,619 | 8/1972 | McCardell, Jr. et al. . | |
| 3,758,189 | 9/1973 | Cordrino | 29/519 X |
| 3,905,220 | 9/1975 | Sosinski . | |
| 3,909,900 | 10/1975 | Gudmestad | 29/863 X |
| 3,989,400 | 11/1976 | Smith et al. | 29/519 X |
| 4,019,236 | 4/1977 | Osman | 29/753 |
| 4,398,337 | 8/1983 | Yamaguti et aol. | 29/753 X |
| 4,443,936 | 4/1984 | Lazaro, Jr. | 29/863 |
| 4,785,656 | 11/1988 | Kennedy | 72/402 |
| 4,828,516 | 5/1989 | Shaffer . | |

FOREIGN PATENT DOCUMENTS

| | | | |
|---|---|---|---|
| 667163 | 7/1963 | Canada | 29/863 |

*Primary Examiner*—Carl E. Hall
*Assistant Examiner*—Carl J. Arbes
*Attorney, Agent, or Firm*—Katherine A. Nelson

[57] ABSTRACT

A die set 20 for crimping an electrical connection of a contact terminal member to an electrical conductor comprises two hermaphroditic members 22, 22'. The die members 22, 22' are positioned in opposing relationship along a crimping axis and are reciprocally movable relative to each other along the axis. Each die member 22 has a base section 24 including an anvil 40 extending from the base section 24 and defining an essentially hemispheric concave crimping surface 42 having a selected desired radius. In operation, the anvils 40, 40' are opposed so that upon completion of the crimping portion of a stroke, a symmetrical essentially cylindrical recess 60 is defined having an axis orthogonal to the crimping axis. Each die member 22 further includes a bifurcated plate section 46 including edge surfaces 50 defining a slot 52 having an axis parallel to the cylindrical recess axis. A contact terminal member 80 having an outer diameter at least larger than the diameter of the cylindrical recess and having a wire portion 92 inserted therein, is crimped by placing the terminal member 80 between the opposing die members 22, 22' and parallel to the cylindrical recess axis. As the opposing die members 22, 22' are urged together, the edge surfaces 50, 50' of the respective plate sections 46, 46' initiate bulk deformation of side surfaces 85 of the terminal member 80, and the crimping surfaces of the anvils 40, 40' define a crimped electrical connection 96 cylindrical in shape and having a diameter equal to the cylindrical recess diameter.

7 Claims, 7 Drawing Sheets

CRIMPING DIE AND CRIMPED ELECTRICAL CONNECTION THEREFROM

FIELD OF THE INVENTION

This invention relates to electrical connections comprising electrical terminal members crimped to electrical conductor members and more particularly, to an improved crimping die for effecting electrical connections.

BACKGROUND OF THE INVENTION

One customary way of forming an electrical connection between an electrical terminal having a conductive metal ferrule or barrel to an electrical conductor member is by means of crimping. Typically insulating material is stripped from the end of the electrical conductor and the stripped end of the conductor is inserted into the barrel or ferrule member. Compression force is then applied to the barrel or ferrule to press and permanently deform it into an electrically conductive and mechanically strong connection with the ends of the conductor wires contained therein. One principle objective of crimping is to form an intimate electrically conductive connection of the wire ends to the metal barrel that is strong enough mechanically so that the barrel is firmly attached to the wires and resists being inadvertently pulled off.

Most approaches to crimping use a pair of opposing die members having opposed and cooperating crimping surfaces that produce a crimp having a distinctive cross sectional shape such as those disclosed in U.S. Pat. No. 3,098,517 (oval shape), U.S. Pat. No. 2,359,083 (diamond shape), U.S. Pat. No. 2,693,216 ("W" shape), and U.S. Pat. No. 4,828,516 ("oblique" crimp).

One deficiency of the above crimps is that the compression force and the shape of the die members cause the material in the crimped area to flatten and expand or extrude radially outwardly relative to the original size of the conductor wire or terminal. Owing to the increased radial width of the terminated section, adjacent conductors having contact terminals crimped thereto need to be spaced sufficiently far apart to avoid accidental electrical engagement between the adjacent members. Furthermore, if the crimped terminal members are used in housings, the cavities of the housings need to be appropriately dimensioned to receive the crimped terminal members. Thus a bulky crimp area interferes with the miniaturization of electronic equipment that utilizes a plurality of crimped terminal members in a confined space. Additionally the non-symmetrical nature of many of such crimps may require that the crimped terminal be oriented in a specific manner within a particular electrical housing. It is desirable, therefore, to have a means for crimping an electrical terminal wherein the crimped section of the terminal does not extend beyond the outside diameter of the insulation of the electrical conductor and preferably does not extend beyond the original outside diameter of the terminal member itself. In addition it is also desirable to have a cost effective means for crimping electrical terminals and preferably one that will reduce assembly operations.

SUMMARY OF THE INVENTION

In accordance with the present invention a means for crimping electrical terminals is disclosed that alleviates disadvantages and deficiencies of the prior art and furthermore provides a crimped electrical contact terminal having a crimped section that does not extend beyond the width of the complete interconnection envelope.

It is an object of the present invention to provide a crimping means that will facilitate miniaturization of electronic equipment.

It is a further object of the invention to provide a crimping die set having a pair of hermaphroditic members, thus reducing the tooling cost for making the die members.

It is yet another object of the invention to provide a means of manufacturing crimped electrical terminal members in a cost effective manner.

It is a further object of the invention to produce a crimped electrical terminal having a symmetrical crimped portion to alleviate the problem of orienting the terminal within the housing.

It is an additional object of the invention to provide a crimped terminal wherein the crimped portion also provides means for cooperating with a locking feature of a housing for retaining the terminal within the housing member.

It is also an object of the invention to provide a means for crimping terminal members that eliminates a separate assembly operation for providing a terminal member with another means for securing the terminal member in a housing.

Accordingly the present invention is directed to a set of die members for crimping an electrical connection of a contact terminal member to an electrical conductor, each die member being adapted to cooperate with the other die member when positioned in an opposing relationship therewith along a crimping axis. The two opposing die members are reciprocally moveable relative to one another along the axis during a stroke to apply crimping force to effect an electrical connection. Each die member has a base section including an anvil extending from the base section and defining an essentially hemispheric concave crimping surface having a selected desired radius. The anvils of the two die members are opposed so that upon completion of the crimping portion of a stroke, a symmetrical essentially cylindrical recess is defined having an axis orthogonal to the crimping axis. The cylindrical recess and its axis have a selected length, and each anvil includes a first portion along a first half of the recess axis and a second portion along a second half thereof.

Each die member further includes a bifurcated plate section extending integrally from the first portion of the anvil normal to the recess axis, the plate section having major surfaces facing along the recess axis. The plate section includes edge surfaces defining a slot having an axis parallel to the cylindrical recess axis and having a bottom defined by the crimping surface of the anvil. The edge surfaces extend initially tangentially outwardly from sides of the crimping surface. The plate sections of the opposing die members are parallel to each other and offset from each other along the cylindrical recess axis so that portions thereof pass by each other during a crimping stroke.

Each second anvil portion comprises a pedestal extending to the crimping surface from the base section and having generally vertical side surfaces. The edge surfaces of the plate section of each die member are divergent thereby receiving therebetween the second portion of the anvil of the other die member. The die members further include cooperating means to stop the crimping stroke upon completion of the crimping portion thereof.

An electrical contact member having an outer diameter at least larger than the diameter of the cylindrical recess and having a wire inserted therein is crimped by placing the terminal member and its associated wire between the opposing die members and parallel to the cylindrical recess axis and urging the opposed die members together. The edge surfaces of the plate section initiate bulk deformation of the sides surfaces of the contact terminal member and the crimping surfaces of the anvils define a crimped electrical connection cylindrical in shape and having a diameter equal to the cylindrical recess diameter. The resulting crimp portion of the terminal member includes forward and rearward facing surfaces substantially disposed in respective planes orthogonal to the contact terminal member. The resulting essentially parallel space provides a means for cooperating with latching features of a housing in which the terminal member is to be used.

The invention itself, together with further objects and its intended advantages, will be best understood by reference to the following detailed description taken in conjunction with the following drawings.

BRIEF DESCRIPTION OF THE DRAWINGS

FIG. 3 is an exploded partially cross-sectional view of the die members of FIG. 1 and illustrating the positioning of a terminal member between the open die set.

DETAILED DESCRIPTION OF THE DRAWINGS

Figures 1, 2:
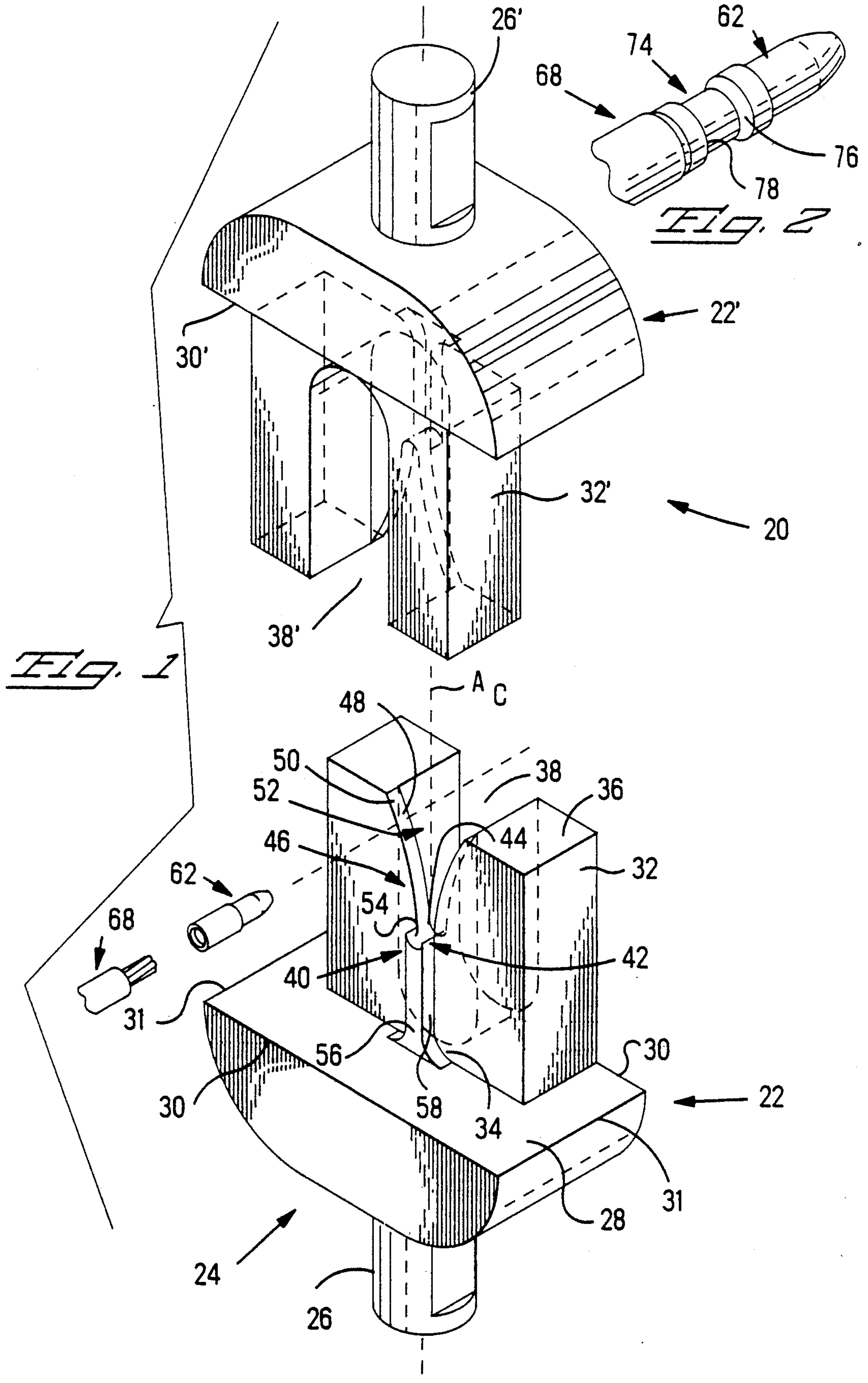
FIG. 1 is a perspective view of opposing die members of the present invention, the members being exploded from each other and having a terminal member and its associated conductor exploded therefrom.
FIG. 2 is a perspective view of the terminal member shown in FIG. 1 after it has been crimped in accordance with the invention.

FIGS. 1 through 5 illustrate the operation of a means for effecting electrical connections between electrical contact terminals and respective electrical conductors. The means comprises a die set 20 having two identical hermaphroditic die members 22, 22'. The structure of one die member 22, therefore, will be discussed in detail. Similar but primed reference numerals will be used to identify corresponding surfaces on opposing hermaphroditic die member 22'. The die members 22, 22' are designed to be used in opposed relationship and are reciprocally moveable relative to each other along a crimping axis $A_C$. The tool is made from suitable materials as known in the art and is being shown with a shaft for mounting the die set in a semi-automatic or automatic press. It is to be understood that the mounting means may be altered to accommodate hand tools and the like.

Figure 12:
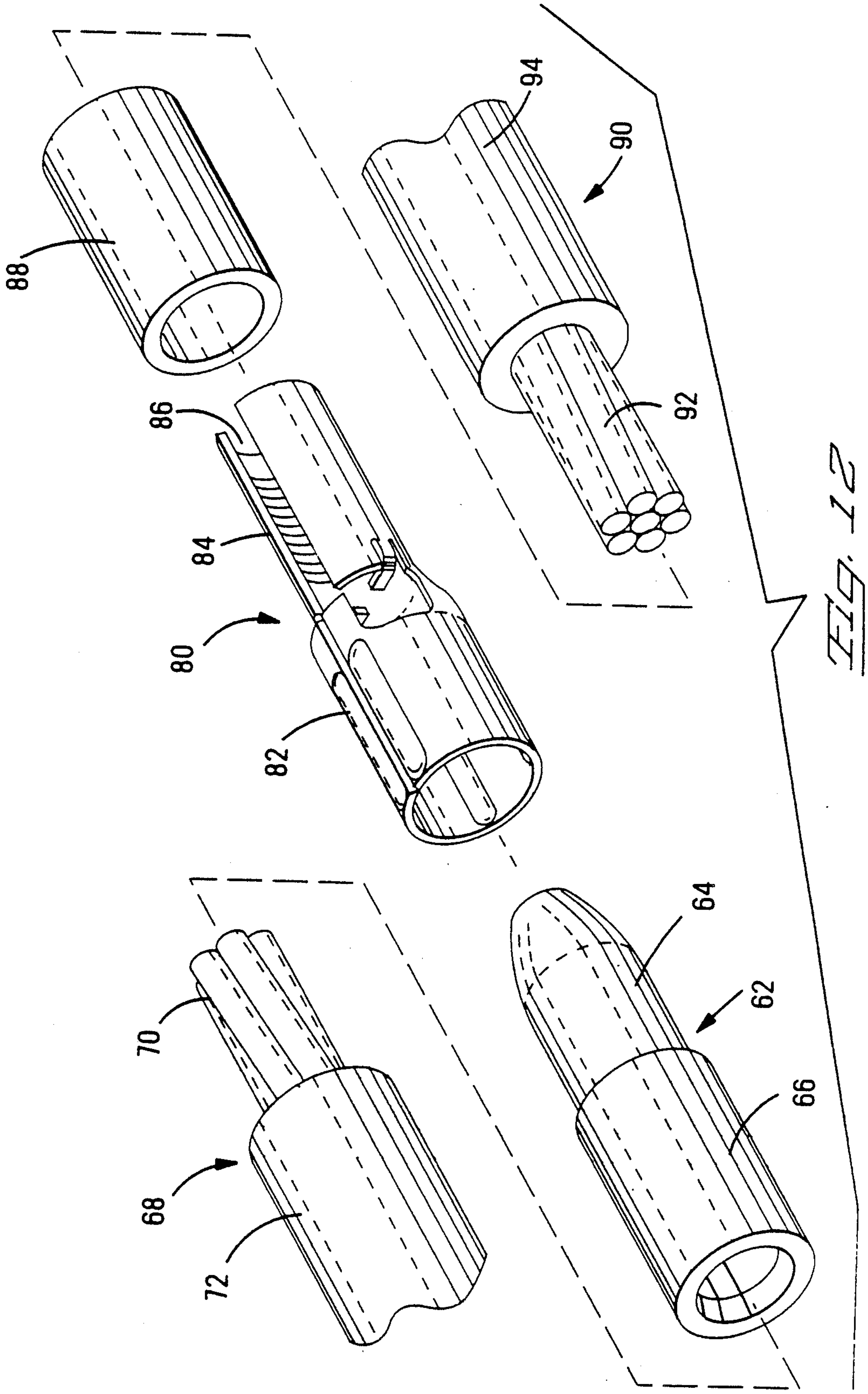
FIG. 12 is an exploded view of the terminal members of FIGS. 1 and 2.

Die set 20 is designed to be used for crimping wire barrel terminals. For purposes of illustrating the invention the die members 22. 22' will be shown with terminal members 62, 80, which are disclosed in U.S. patent application Ser. No. 07/225,990 filed July 29, 1988. The basic structure of terminals 62, 80 are shown in FIG. 12. Male terminal member 62 includes an essentially solid pin portion 64 and a wire barrel portion 66 for receiving a stripped portion of wires 70 of electrical conductor 68. Conductor 68 includes insulating jacket 72. Female terminal member 80 includes a socket portion 82 and an inner sleeve portion 84 having longitudinal slot 86 extending therealong. Inner sleeve portion is adapted to receive a stripped portion of wires 92 of electrical conductor 90. Conductor 90 includes insulating jacket 94. Terminal member 80 further includes an outer sleeve 88 which is disposed over inner sleeve 84. It is to be understood that other types of wire barrel terminals may also be crimped using this tool.

Figure 1A:
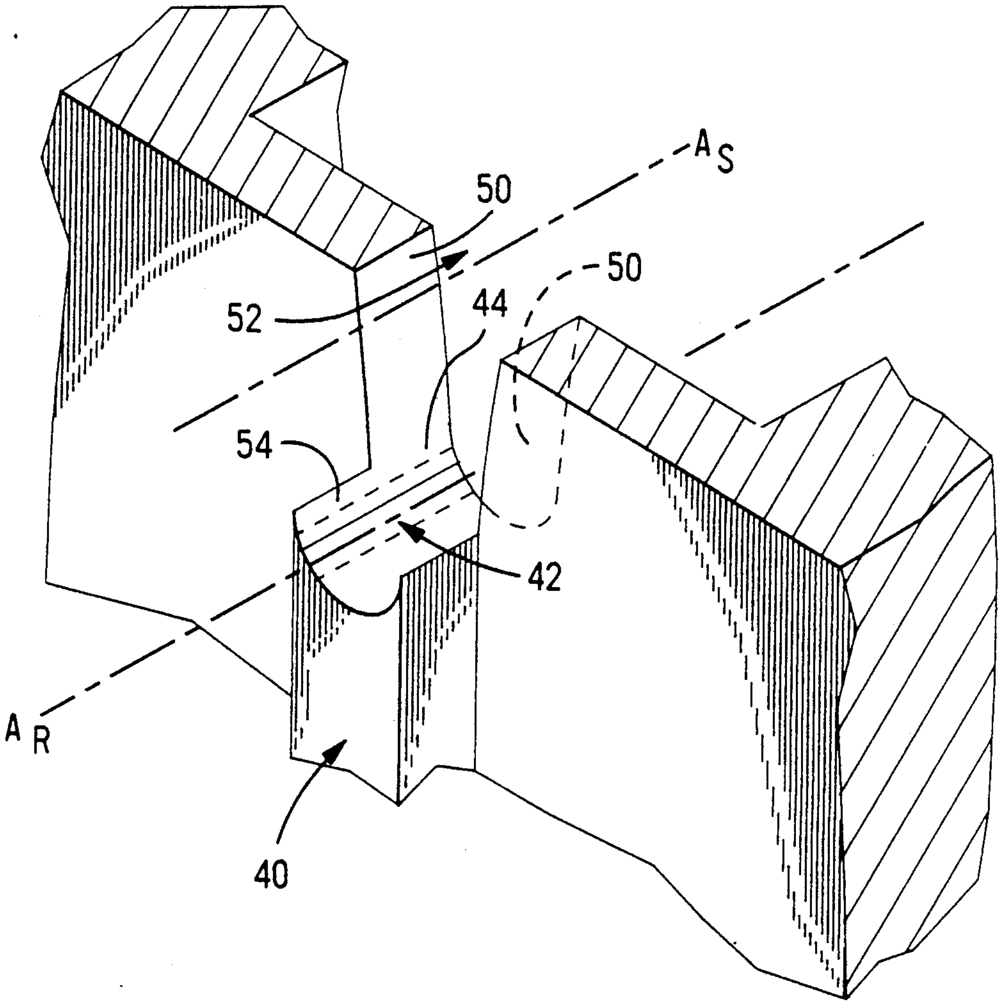
FIG. 1A is a greatly enlarged portion of FIG. 1 further illustrating the crimping surface of one of the die members.

Referring now to FIGS. 1, 1A and 3 through 5A and in particular to FIGS. 1, 1A and 2, die member 22 is comprised of a base section 24 having a major surface 28, an anvil 40 extending from base section 24 and defining a crimping surface 42 and a bifurcated plate section 46 extending integrally from anvil 40. Shaft section 26 for mounting die member 22 in a press (not shown) extends from one side of base section 24. On the side opposite shaft section 26, base section 24 includes major surface 28, which is essentially a rectangle having opposed longitudinal edges 30 and opposed side edges 31. A pair of integral leg members 32 extend outwardly from major surface 28 and are essentially perpendicular thereto. Legs 32 are joined by bight section 34 adjacent major surface 28 and define slot 38 therebetween. Legs 32 extend along one edge 30 of major surface 28 and inwardly along major surface 28 to a depth essentially equal to one half the width thereof.

Anvil 40 defines an essentially hemispheric concave crimping surface 42 having a desired selected radius and a selected length. When crimping a terminal, anvils 40, 40' are opposed to each other so that upon completion of the crimping portion of a stroke, a symmetrical essentially cylindrical recess (shown in FIG. 5) is defined having an axis $A_R$ orthogonal to the crimping axis $A_C$. Anvil 40 includes a first portion 44 along a first half of the recess axis $A_R$ and a second portion 54 along a second half thereof as best seen in FIG. 1A. Bifurcated plate section 46 extends integrally from the first portion 44 of the anvil normal to the recess axis $A_R$. Plate section 46 has major surfaces 48 facing along the recess axis $A_R$ and includes edge surfaces 50 defining a slot 52. Edge surfaces 50 are disposed on respective planes orthogonal to the cylindrical recess axis $A_R$ with slot 52 being located along the innermost portions of legs 32 forward of and adjacent to slot 38. The width of slot 52 is less than the width of slot 38 and edge surfaces 50 of slot 52 are divergent, thus providing a lead in surface for terminal members being crimped. Slot 52 has an axis $A_S$ parallel to the cylindrical recess axis $A_R$ and a bottom defined by the crimping surface 42 of anvil 40 and a top defined by the top surface 36 of legs 32. The edge surfaces 50 extend initially tangentially outwardly from sides of the crimping surface 42. In operation, plate sections 46, 46' of the opposing die members 22, 22' are parallel to each other and offset from each other along the cylindrical recess axis $A_R$ so that portions thereof pass by each other during the crimping stroke as indicated in FIG. 3. The edge surfaces 50, 50' of the respective plate sections 46, 46' of each of the opposed die members 22, 22' are divergent for receiving therebetween a respective portion of the anvil 40', 40 of the opposing die member 22', 22.

The second anvil portion 54 as best seen in FIG. 1 comprises a pedestal 56 extending to the crimping surface 42 from base section 24. Pedestal 56 is integral with legs 32 and is adjacent the inner face of legs 32 at bight section 34. Pedestal 56 has generally vertical side surfaces 58 and is adapted to be received between the edge surfaces 50' of plate section 46' of mating die member 22' during the crimping operation. Concomitantly pedestal 56' is received between edge surfaces 50 of plate section 46 of die member 22 as shown in FIG. 5.

Die member 22 is adapted to cooperate with a like member 22' positioned in an opposing relationship therewith along a crimping axis. The anvils 40 on die members 22, 22' are configured so that upon completion of the crimping portion of a stroke a symmetrical essentially inwardly extending cylindrical recess 60 is formed between the opposed die members as best seen in FIG. 5. The recess 60 defines an axis orthogonal to the crimping axis. As shown in FIG. 3, the plate sections 46, 46' of respective die members 22, 22' are parallel to each other and offset from each other along the cylindrical recess axis $A_R$ so that portions of thereof pass by each other during a stroke.

FIG. 2 shows terminal member 62 after it has been crimped by die set 20 to form crimp recess 74 in accordance with the invention. As can be seen from this Figure, crimp recess 74 extends along a portion of terminal member 62 and has forward and rearward facing surfaces 76, 78 substantially disposed in respective planes orthogonal to the axis of terminal member 62. As can be appreciated, the terminal member to be crimped by the die set of the present invention needs to have an outer diameter at least larger than the diameter of the cylindrical recess of the die set in order for the die members to properly crimp the terminal and the wire therein.

Figure 5:
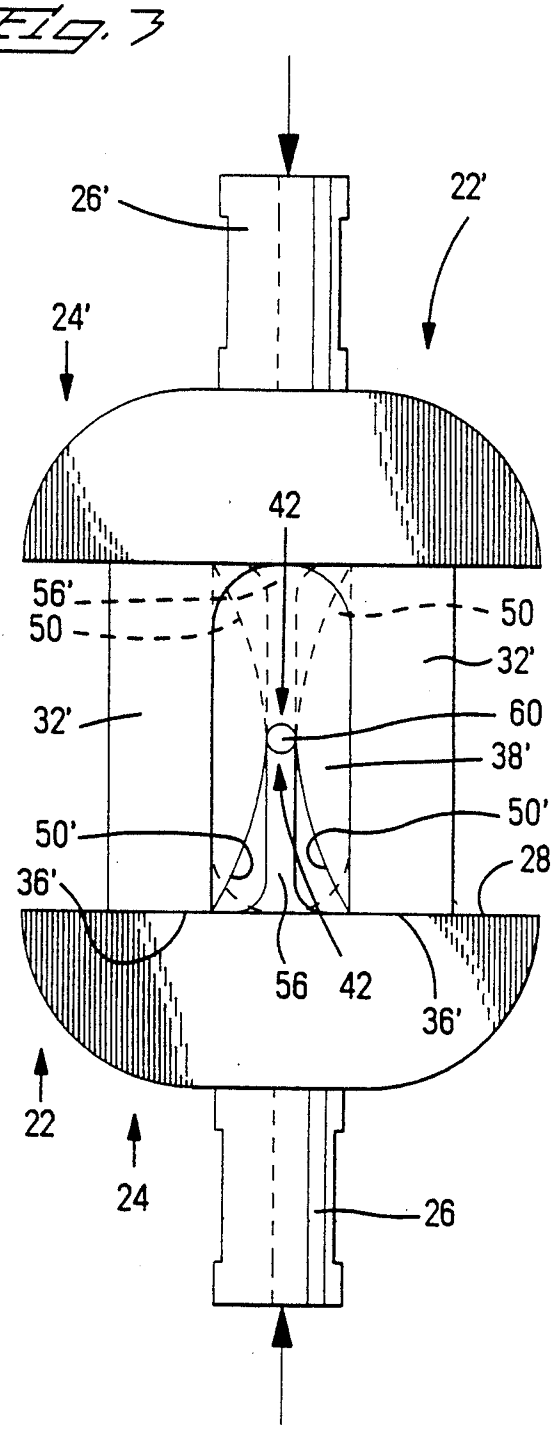
FIG. 5 is a view of the front face of the die members of FIG. 1 in a fully closed position with the terminal removed therefrom.
Figure 4:
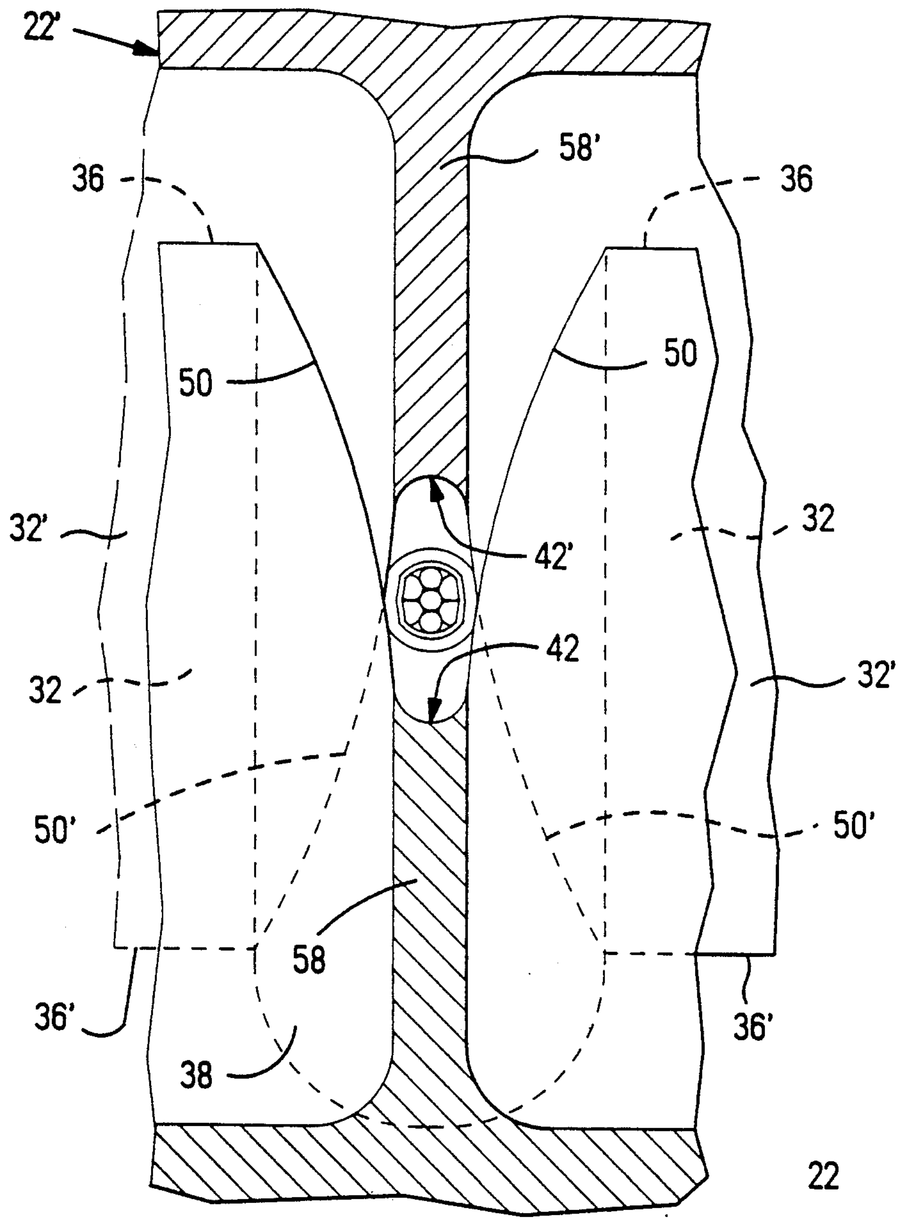
FIG. 4 is a fragmentary enlarged cross-sectional view of the partially closed die members taken along line 4—4 of FIG. 3 illustrating the action of the die members on the terminal member of FIG. 3 being crimped thereby.
Figure 4A:
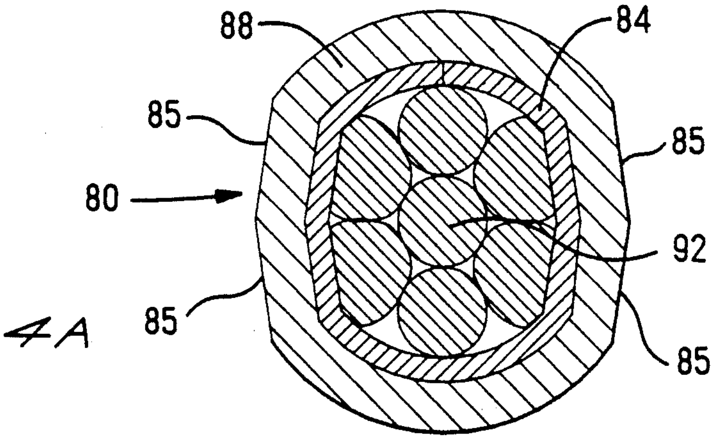
FIG. 4A is a greatly enlarged portion of FIG. 4 illustrating the action of the die set on the partially crimped terminal member.
Figure 7:
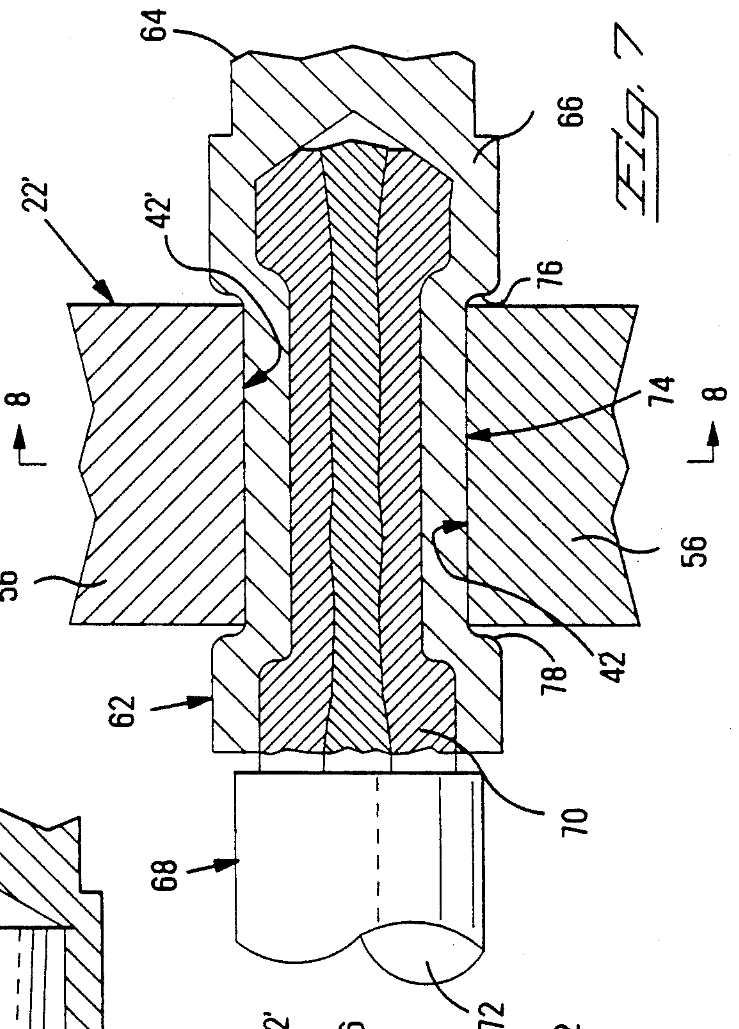

The action of die set 20 is shown sequentially in FIGS. 3 through 5 wherein terminal 80 having stripped wire 92 of conductor member 90 disposed therein is placed between the opposing die members 22, 22' and parallel to the cylindrical recess axis $A_R$ as is shown in FIG. 3. As the opposing die members 22, 22' are urged together respective edge surfaces 50, 50' of respective plate sections 46, 46' initiate bulk deformation of the side surfaces 85 of contact terminal member 80 as the die members 22, 22' are moved together as best seen in FIGS. 4 and 4A. As the anvils 40, 40' are moved together, terminal member 80 is moved along corresponding slots 52, 52' and toward the crimping surfaces 42, 42'. Since the edges 50, 50' of respective slots 52, 52' in bifurcated plates 46, 46' converge as they approach the corresponding crimping surfaces 42, 42', the side surfaces 85 of terminal 80 are partially deformed before the die members 22, 22' are completely closed. FIG. 5 shows the opposed die members in the closed position with the cylindrical recess 60 at the center. For purposes of illustration the terminal member has been omitted from FIG. 5. In operation the major surface 28 of die member 22 acts as a stop surface for the end surfaces 36' of legs 32' of opposed die member 22'. The crimp is effected upon the bottoming out of the die members one against the other. Thus the configuration of the die member 22 prevents exertion of excessive pressure at the crimp portion and excess thinning of the terminal wall thereby.

The crimping surfaces 42, 42' of the anvils 40, 40' define a crimped electrical connection having the same configuration as that previously described and shown in FIG. 2. The resulting crimp recess has a diameter equal to the cylindrical recess diameter. The present invention provides a means for crimping a terminal member without increasing the diameter of the remaining portions of the crimped terminal.

Figure 7:
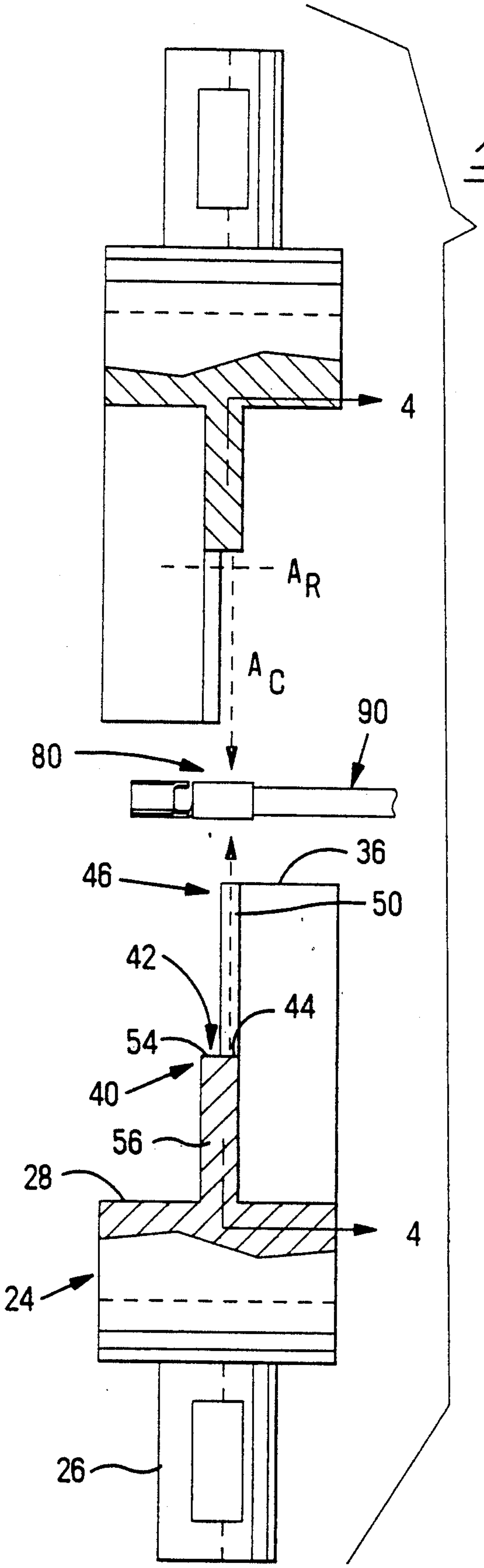
FIG. 7 is a fragmentary cross-sectional view of the terminal of FIG. 6 being crimped with the die members of the invention, taken along the line 7—7 of FIG. 8.
Figure 6:
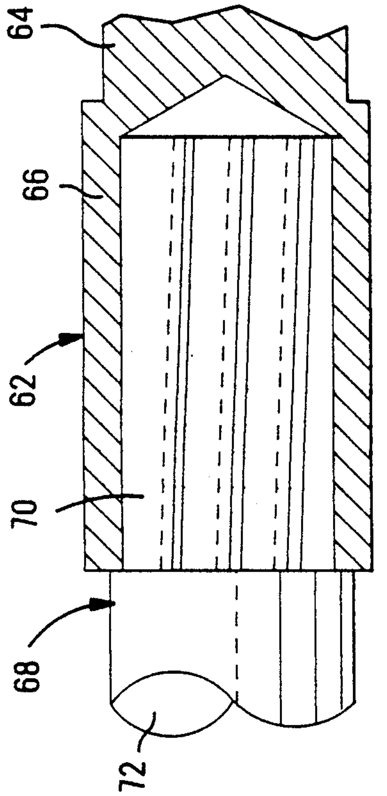
FIG. 6 is a fragmentary cross-sectional view of a stripped end of a conductor disposed in the wire barrel portion of the terminal member of FIG. 1.
Figure 8:
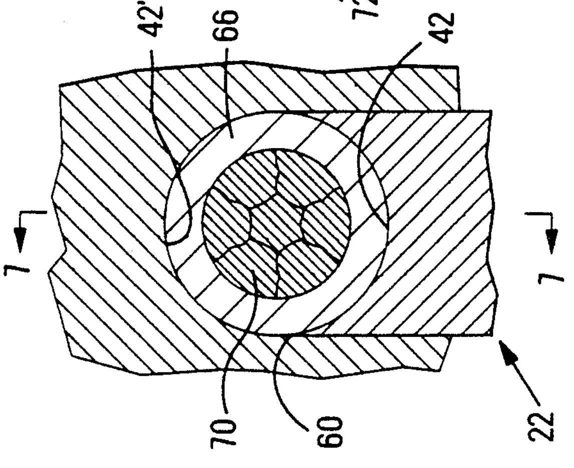
FIG. 8 is a cross-sectional view of the crimped terminal member of FIG. 6, taken along the line 8—8 of FIG. 7.

The formation of the crimps in terminals 62, 80 is shown more clearly in FIGS. 6 through 8 and 9 through 11, respectively. FIGS. 6 through 8 show the crimping action of the anvils 40, 40' in crimping male terminal member 62 having a stripped wire portion 70 extending into barrel portion 66 as seen in FIG. 6. The action of the opposed anvils 40, 40' pushes material of the terminal member 62 inwardly and longitudinally outwardly in the directions shown by the arrows. The crimp recess 74 along the terminal member 62 includes forward and rearward facing surfaces 74 and 76 disposed in respective plane orthogonal to the contact terminal member 62. The resulting crimped section of the terminal extends inwardly thus providing a surface for cooperating with locking means in a connector housing (not shown). Furthermore, since the crimp recess 74 extends circumferentially around the terminal 62, the terminal member need not be oriented in a particular direction for engaging a locking means.

Figure 10:
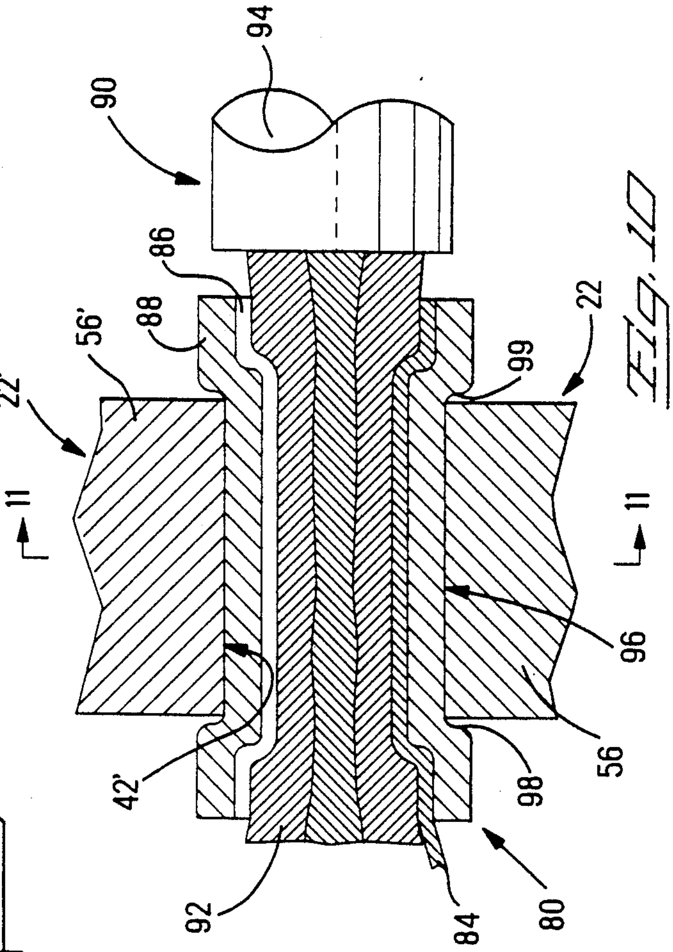
FIG. 10 is a fragmentary cross-sectional view of the terminal of FIG. 9 being crimped with the die members of the invention, taken along the line 10—10 of FIG. 11.
Figure 9:
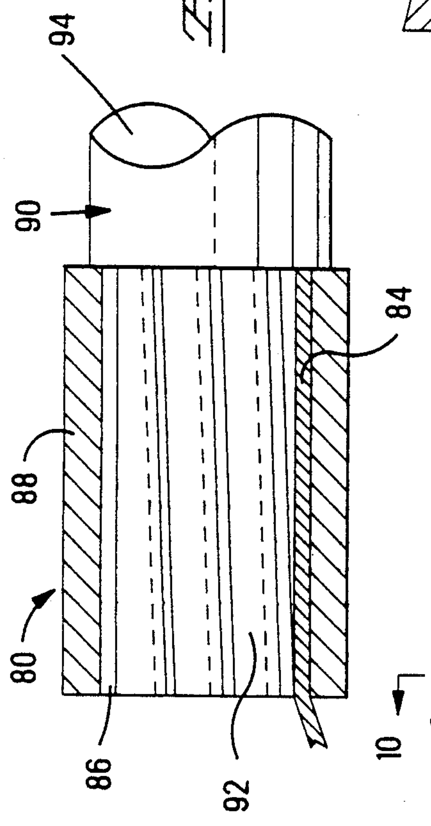
FIG. 9 is a fragmentary cross-sectional view of a stripped end of a conductor disposed in the wire receiving portion of the terminal member of FIG. 2.
Figure 11:
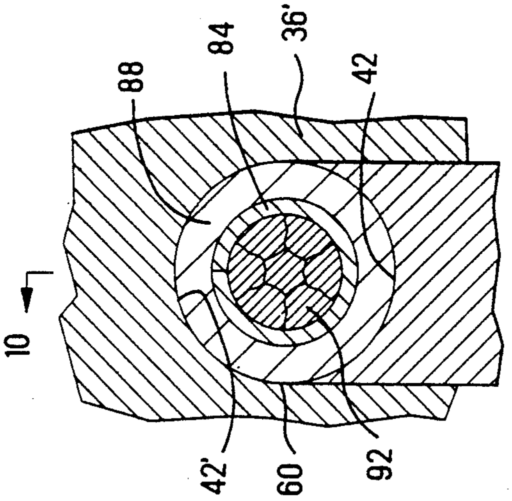
FIG. 11 is a cross-sectional view of the crimped terminal member of FIG. 9, taken along the line 11—11 of FIG. 10.

FIGS. 9 through 11 show the action of opposed anvils 40, 40' in crimping female terminal member 80 having a stripped wire portion 88 extending into sleeve portion 84 as seen in FIG. 9. As is again shown in these Figures, the action of the opposed anvils 40, 40' pushes material of the terminal member 80 inwardly and longitudinally outwardly in the directions shown by the arrows. The resulting crimp recess 96 extends along the terminal member 80 and includes forward and rearward facing surfaces 98 and 99 disposed in respective plane orthogonal to the contact terminal member 80. As is illustrated in these Figures, the inwardly directed crimp extends circumferentially around the terminal and therefore does not increase the diameter of the crimped terminal.

The die set or crimping tool of the present invention, therefore, provides a means whereby a closed barrel terminal may be crimped to a connector wire while maintaining the entire interconnection envelope within a controlled diameter, preferably no greater than the diameter of the insulation surrounding the conductor wire.

In accordance with the invention, the selected length of the axis of the cylindrical recess is determined by the diameter of the contact terminal and the diameter of the wire to be terminated in the contact terminal. It is essential that the compression or crimping force be sufficient to secure mechanically the wire within the terminal while maintaining the integrity of the electrical terminal. The thickness of the wall of the terminal within the crimped portion should not be reduced beyond the amount necessary to effect a good mechanical crimp. It is necessary, therefore, to have a separate die set made for each different diameter of terminal being crimped therein. Since the die set of the invention is a pair of hermaphroditic members, only one machined tool is required for making each different size die set, rather than two per size. Thus the cost of manufacturing the crimping tool is greatly reduced.

One feature of the present invention is that the die set and the resulting crimp therefrom contribute to the ability to miniaturize electronic equipment. Since the crimped portion is not larger than the diameter of the contact terminal itself and preferably no larger than the insulation on the wire terminated the contact member, no additional space need be provided for the crimped sections as required in the previous art. Adjacent conductors, therefore, may be placed more closely together than was possible with the terminations in the previous art.

The present invention provides a means for crimping a barrel type terminal that is suitable for use in both power and signal connections. The die set as disclosed herein and shown in the accompanying figures provides a one piece hermaphroditic die member that can be manufactured in a cost effective manner. The die member provides a means for crimping a terminal whereby the outside diameter of the crimped terminal is not increased by the crimping process thereby maintaining the same size interconnection envelope as the original terminal and insulated wire member. Further, the same area of the terminal concomitantly provides a location for crimping the electrical terminal and a means for cooperating with latching means of a housing for maintaining the terminal member within the connector housing. This feature eliminates the need for an additional manufacturing step such as screw machining a recess or otherwise providing a separate locking feature for the terminal member.

It is thought that the crimping die of the present invention and many of its intended advantages will be understood from the foregoing description. Changes may be made in the form and construction and arrangement of parts thereof without departing from the spirit and scope of the invention or sacrificing all of its material advantages.

I claim:

1. A method for crimping a terminal member whereby an annular recess is formed, the method comprising the steps of:

selecting a pair of die members adapted to cooperate with each other member when positioned in opposing relationship therewith along a crimping axis, said two die members being reciprocally movable relative to each other along said axis during a stroke to apply crimping force to said electrical connection, each of said die members having an essentially hemispheric concave crimping surface with a selected desired radius so that upon completion of the crimping portion of a stroke, a symmetrical essentially cylindrical recess is defined having an axis orthogonal to said crimping axis; each of said die members further including a bifurcated plate section extending integrally from said crimping surface, said plate section having major surfaces facing along said recess axis and said plate section including edge surfaces defining a slot having an axis parallel to said cylindrical recess axis and having a bottom defined by said crimping surface, said edge surfaces extending initially tangentially outwardly from sides of said crimping surface, said plate sections of said opposing die members being parallel to each other and offset from each other along said cylindrical recess axis so that portions thereof pass by each other during a said stroke;

positioning a terminal member having an outer diameter at least larger than the diameter of said cylindrical recess and having a wire inserted therein between said opposing die members and parallel to said cylindrical recess axis; and urging said opposing die members together along said crimping axis until said crimping stroke is completed and said crimping surfaces define a crimped electrical connection cylindrical in shape and having a diameter equal to said cylindrical recess diameter; whereby an annular recess is formed in said crimped terminal.

2. The method of claim 1 further including the step of providing said edges of said plate section with curved sections whereby said edge surfaces of said plate sections initiate bulk deformation of side surfaces of said contact terminal member.

3. The method of claim 1 further including the step of providing stop means on said die members to stop said crimping stroke upon completion thereof.

4. A die set for crimping an electrical connection of a contact terminal member to an electrical conductor, each said die member being adapted to cooperate with the other die member when positioned in opposing relationship therewith along a crimping axis, said two die members being opposed and being reciprocally movable relative to each other along said axis during a stroke to apply crimping force to said electrical connection, comprising:

each said die member having a base section including an anvil extending from said base section and defining an essentially hemispheric concave crimping surface having a selected desired radius, said anvils being opposed so that upon completion of the crimping portion of a stroke, a symmetrical essentially cylindrical recess is defined having an axis orthogonal to said crimping axis, said cylindrical recess axis having a selected length, and each said anvil having a first portion along a first half of said recess axis and a second portion along a second half thereof;

each said die member further including a bifurcated plate section extending integrally from said first portion of said anvil normal to said recess axis, said plate section having major surfaces facing along said recess axis and said plate section including edge surfaces defining a slot having an axis parallel to said cylindrical recess axis and having a bottom defined by said crimping surface of said anvil, said edge surfaces extending initially tangentially outwardly from sides of said crimping surface, said plate sections of said opposing die members being parallel to each other and offset from each other along said cylindrical recess axis so that portions thereof pass by each other during a said stroke;

each said second anvil portion comprising a pedestal extending to said crimping surface from said base section and having generally vertical side surfaces, and said edge surfaces of said plate section of each said die member being divergent thereby receiving therebetween said second portion of said anvil of the other said die member; and said die members including cooperating means to stop said crimping stroke upon completion of the crimping portion of said stroke, whereby when a said contact terminal member with an outer diameter at least larger than the diameter of said cylindrical recess and having a conductor inserted therein, is placed between said opposing die members and parallel to said cylindrical recess axis, and said opposing die members are urged together, said edge surfaces of said plate sections initiate bulk deformation of side surfaces of said contact terminal member, and said crimping surfaces of said anvils define a crimped electrical connection cylindrical in shape and having a diameter equal to said cylindrical recess diameter.

5. The set of die members of claim 4 wherein each of said plate sections includes outwardly facing major surfaces disposed on respective planes orthogonal to said cylindrical recess axis and said crimp recess along said terminal member resulting from crimping includes forward and rearward facing surfaces substantially disposed in respective planes orthogonal to the axis of said contact terminal member.

6. The set of die members of claim 4 wherein said die members are hermaphroditic members.

7. The set of die members of claim 4 wherein said edges of said plate sections are curved.

* * * * *